US006666529B2

(12) United States Patent
Mohr

(10) Patent No.: US 6,666,529 B2
(45) Date of Patent: Dec. 23, 2003

(54) VEHICLE BRAKE SYSTEM HAVING A GAS PRESSURE ACCUMULATOR

(75) Inventor: Kurt Mohr, Halsenbach (DE)

(73) Assignee: Lucas Varity GmbH (DE)

( * ) Notice: Subject to any disclaimer, the term of this patent is extended or adjusted under 35 U.S.C. 154(b) by 0 days.

(21) Appl. No.: 10/216,064

(22) Filed: Aug. 9, 2002

(65) Prior Publication Data

US 2003/0038532 A1 Feb. 27, 2003

Related U.S. Application Data

(63) Continuation of application No. 10/143,731, filed on May 9, 2002, now Pat. No. 6,616,247, which is a continuation of application No. PCT/EP00/10809, filed on Nov. 2, 2000.

(30) Foreign Application Priority Data

Nov. 11, 1999 (DE) ........................................ 199 54 326

(51) Int. Cl.[7] ................................................ F16D 31/02
(52) U.S. Cl. ........................................... 303/87; 138/30
(58) Field of Search ............................... 303/10.11, 87, 303/85; 138/30, 31

(56) References Cited

U.S. PATENT DOCUMENTS 3,653,729 A 4/1972 Newell et al. ................ 303/13
4,858,898 A 8/1989 Niikura et al.
4,997,009 A 3/1991 Niikura et al.
5,152,586 A 10/1992 Burgdorf ................. 303/113.4
6,076,558 A 6/2000 Mohr et al. .................... 138/30
6,189,572 B1 2/2001 Rüffer et al. ................. 138/30
6,363,719 B2 4/2002 Mohr et al. .................... 60/414

FOREIGN PATENT DOCUMENTS

| | | |
|---|---|---|
| DE | 3900899 | 7/1989 |
| DE | 3901261 | 7/1990 |
| JP | 8-121401 | 5/1996 |

*Primary Examiner*—Matthew C. Graham
(74) *Attorney, Agent, or Firm*—MacMillan, Sobanski & Todd, LLC

(57) ABSTRACT

A vehicle brake system having a gas pressure accumulator, which comprises a housing, the interior of which is divided by metal bellows and a disk fastened to the metal bellows in gas-tight manner, into a gas-filled gas chamber and a fluid chamber, wherein via a feed line a fluid may be supplied under pressure to and removed from the fluid chamber, and provided between the fluid chamber and the feed line is a valve arrangement which closes when the pressure in the feed line drops below a minimum value and opens when the pressure exceeds the minimum value, wherein the metal bellows during supply and removal of the fluid executes a stroke motion by means of which the valve arrangement is actuated.

20 Claims, 2 Drawing Sheets

VEHICLE BRAKE SYSTEM HAVING A GAS PRESSURE ACCUMULATOR

CROSS REFERENCE TO RELATED APPLICATIONS

This application is a continuation of application Ser. No. 10/143,731 filed May 9, 2002, now U.S. Pat. No. 6,616,247 which was a continuation of International Application No. PCT/EP00/10809 filed Nov. 2, 2000, which claimed priority to German Patent Application No. 19954326.7 filed Nov. 11, 1999, the disclosures of which are incorporated herein by reference.

BACKGROUND OF THE INVENTION

The invention relates to a vehicle brake system having a gas pressure accumulator, which comprises a housing, the interior of which is divided by metal bellows and a disk fastened to the metal bellows in gas-tight manner into a gas-filled gas chamber and a fluid chamber, wherein via a feed line a fluid may be supplied under pressure to and removed from the fluid chamber, and provided between the fluid chamber and the feed line is a valve arrangement which closes when the pressure in the feed line drops below a minimum value and opens when the pressure exceeds the minimum value, wherein the metal bellows during supply and removal of the fluid executes a stroke motion by means of which the valve arrangement is actuated. The invention further relates to such a gas pressure accumulator.

During operation of the vehicle brake system, the fluid chamber of such gas pressure accumulators is filled, counter to the pressure in the gas chamber, partially or completely with brake fluid, in order to store the latter.

SUMMARY OF THE INVENTION

Particularly high standards are demanded of vehicle brake systems with regard to the operability and reliability of the equipment.

An object of the invention is therefore to provide a safe and reliable vehicle brake system.

An object of the invention is achieved according to the invention by a vehicle brake system of the type described initially having a gas pressure accumulator which comprises the features of claim 1. An object is further achieved by such a gas pressure accumulator. Since the metal bellows executes a stroke motion during supply and removal of the fluid by means of which the valve arrangement is actuated, the closing of the fluid compartment is directly responsive to the movement of the metal bellows whereby a closed safety system is formed.

Further developments of the invention are the subject matters of the dependent claims.

Advantageously connected to the hollow cylinder is a coaxial mandrel on which the piston is guided or which is guided in the piston. By said means a guided movement of the piston relative to the sealing seats is possible and, at the same time, a compact structural shape of the gas pressure accumulator is achieved.

According to a development, the metal bellows are substantially in the shape of a hollow cylinder and the piston as well as the hollow cylinder are disposed radially inside the metal bellows, with the result that a particularly compact structural shape is achieved.

An advantageous refinement provides that the stroke motion of the metal bellows is delimited by two end stops in order to preset defined end positions for the movable components. In the end positions is the valve arrangement in each case closed at the same time.

A seal or a sealing seat is advantageously formed on at least one end stop. On the end stop, therefore, a redundant seal is formed which enables particularly good sealing. In a particularly advantageous manner the redundant seal is disposed on the end stop delimiting the normal position of the piston. Thus, the gas pressure accumulator is sealed particularly well when the pressure in the feed line is lower than the admissible minimum pressure. The pressure in the feed line, the so-called system pressure of the vehicle brake system, may drop below said minimum pressure, the so-called gas admission pressure, especially during extended stationary periods of the vehicle.

The gas pressure accumulator may alternatively be provided with a valve arrangement, which is provided with at least one redundant seal on an end stop but does not have the dual function described above. Given such a valve arrangement, the piston as closing element during a closing motion first contacts a first sealing seat and effects sealing there. Then the piston contacts a second sealing seat, which forms an end stop for the closing element, and effects redundant sealing there. The first sealing seat may correspond to one of the sealing surfaces described above.

To ascertain the necessary tightness of the valve arrangement, at least one seal is advantageously disposed on the piston which may effect sealing against at least one sealing seat.

BRIEF DESCRIPTION OF THE DRAWINGS

Further features and properties are explained by way of the description of two embodiments with reference to the accompanying drawings.

DETAILED DESCRIPTION OF THE INVENTION

Figure 1:
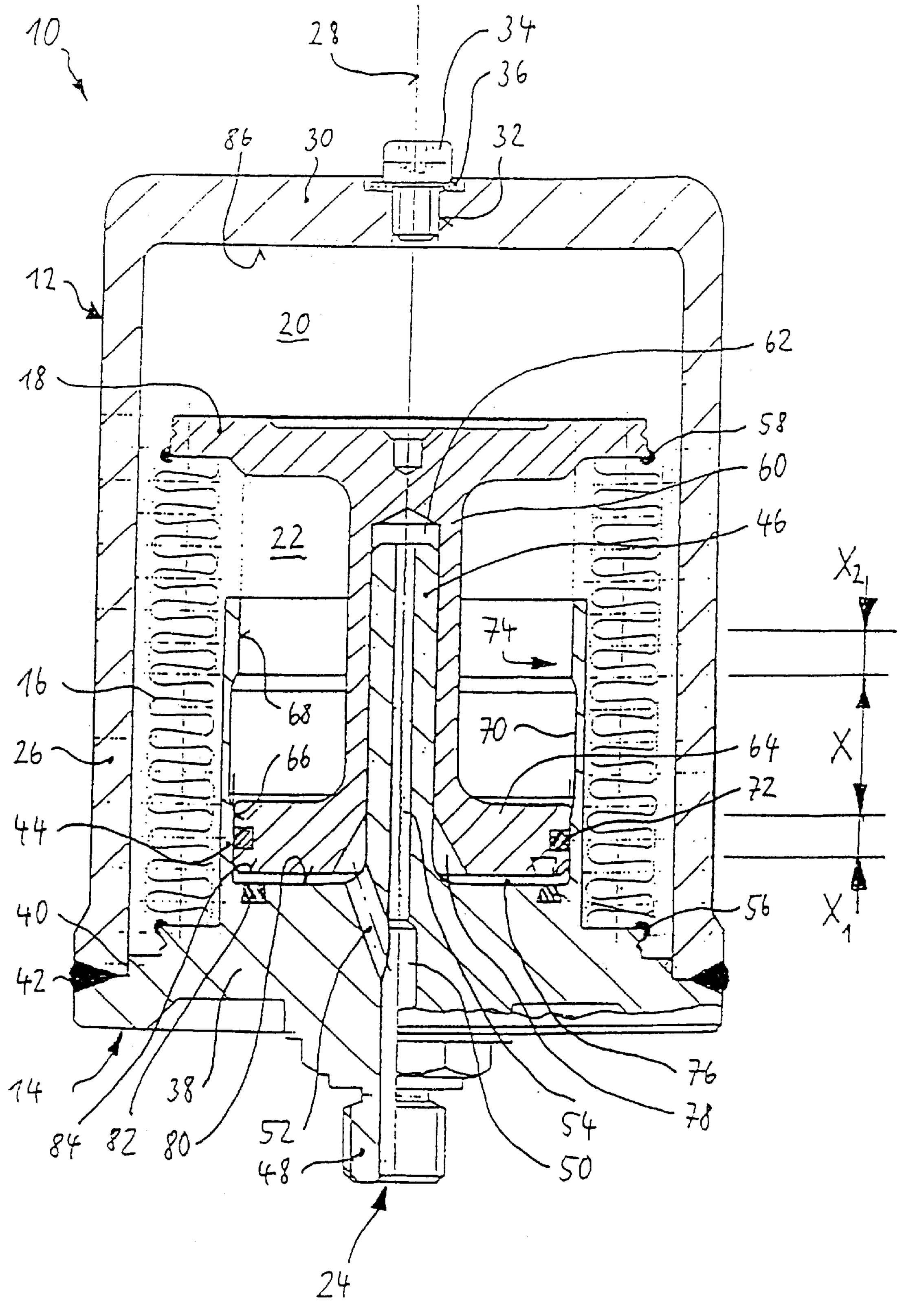
FIG. 1 shows a first embodiment of a gas pressure accumulator according to the invention in longitudinal section.
Figure 2:
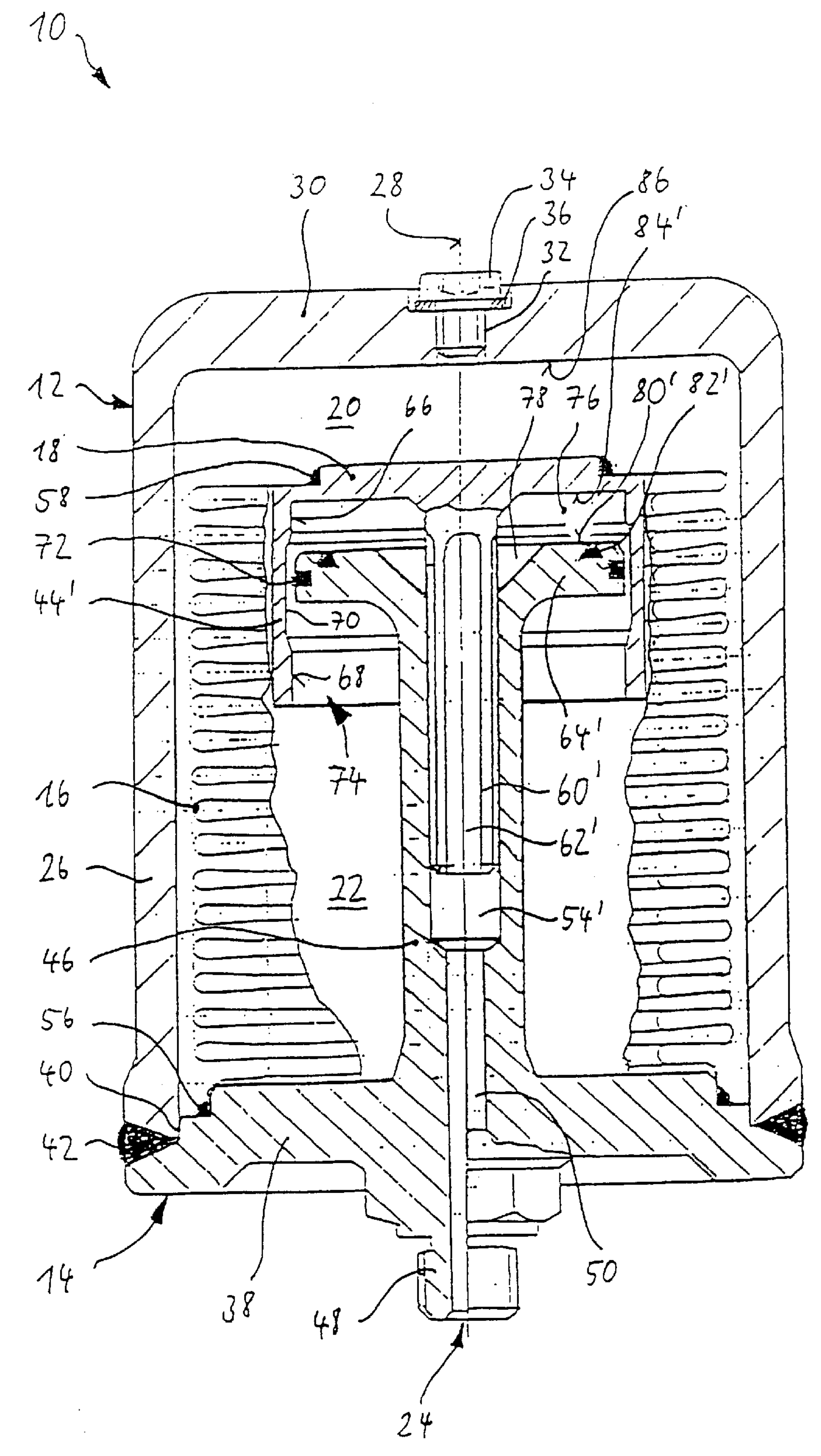
FIG. 2 shows a second embodiment of a gas pressure accumulator according to the invention in longitudinal section.

A gas pressure accumulator 10 illustrated in FIGS. 1 and 2 comprises a can-shaped housing 12, which is closed by a cover 14. The interior of the housing 12 is divided by metal bellows 16, which adjoin the cover 14, and by a disk 18 fastened in a gastight manner thereto into a gas chamber 20 and a fluid chamber 22. The gas chamber 20 is filled with a pressurized gas. The cover 14 is penetrated by a feed line 24, through which a fluid is supplied to the fluid chamber 22 when the pressure in the feed line 24 rises. The fluid is stored in the fluid chamber 22 and removed from the latter when the pressure in the feed line 24 drops.

The housing 12 has a cylindrical outer wall 26 with a longitudinal axis 28. Adjoining the outer wall 26 is a disk-shaped end wall 30 having a threaded bore 32 coaxially formed therein through which the gas may be supplied at a so-called gas admission pressure into the gas chamber 20. The threaded bore 32 is closed by a screw plug 34 resting against a sealing washer 36.

The cover 14 has a disk-shaped closing portion 38, which by means of a shoulder 40 formed on the circumference thereof is centered in and supported against the outer wall 26 of the housing 12. The disk-shaped closing portion 38 is connected in a gastight manner to the outer wall 26 by a weld seam 42.

In the embodiment illustrated in FIG. 1, a hollow cylinder 44 and a mandrel 46 are integrally formed coaxially on the side of the closing portion 38 facing the interior of the housing 12. Integrally formed coaxially on the outside of the closing portion 38 is a connection 48, which is connected by substantially axially directed bores 50, 52 and 54 to the interior of the housing 12.

The metal bellows 16 are folded, substantially cylindrical and connected at both axial ends by weld seams 56 and 58 in a gastight manner to the closing portion 38 and the disk 18, respectively.

The disk 18 is directed normally to the axis and integrally connected to a coaxial rod 60 in which an axial bore 62 is formed, by means of which the rod 60 is guided on the mandrel 46. A piston 64, the diameter of which is greater than that of the rod 60, integrally adjoins the rod 60.

Two axially spaced-apart paraxial sealing surfaces 66 and 68 that are axially aligned and each constitute a sealing seat are formed on the inner periphery of the hollow cylinder 44. Axially between the sealing surfaces 66 and 68, a recess 70 is formed in the inner periphery of the hollow cylinder 44 so that the diameter of the latter in said region is greater than the diameter of the sealing seats on the sealing surfaces 66 and 68.

The piston 64 has a circumferential groove in which a seal 72 in the form of a sealing ring is inserted or injected. The seal 72 is designed in such a way that it cooperates with the sealing surface 66 or 68 and hence forms a valve arrangement 74, which may effect dual sealing in a fluid-tight manner.

FIG. 1 shows the metal bellows 16 in a position in which virtually no fluid is stored in the gas pressure accumulator 10, i.e. the pressure in the fluid chamber 22 has reached its minimum value, the gas admission pressure. The piston 64 in said case is situated almost in a normal position, in which the seal 72 rests against the sealing surface 66 and effects sealing there. Between the piston 64, the hollow cylinder 44 and the closing portion 38 of the cover 14 a so-called admission chamber 76 is therefore created, which is connected only by the bore 52 to the connection 48 but is otherwise closed. The valve arrangement is therefore closed between the feed line 24 and the fluid chamber 22. As no fluid may pass from the fluid chamber 22 into the admission chamber 76, even in the event of a drop of the pressure at the connection 48 the pressure in the fluid chamber 22 remains constant and limited to the minimum value. The metal bellows 16 are therefore reliably protected from damage in the event of a pressure drop.

When the pressure at the connection 48 and/or the feed line 24 rises, the pressure in the admission chamber 76 is also increased and the piston 64 is moved axially, in relation to FIG. 1, upwards, with the metal bellows 16 being extended and the gas chamber 20 being reduced in size. In the region of the recess 70 the incoming fluid may in said case flow around the piston 64 and therefore acts directly upon the metal bellows 16 and/or the disk 18. The rising fluid pressure moves the piston 64, which is connected to the disk 18, in said case virtually free of friction in the region of a stroke distance X, which corresponds to the operating stroke of the gas pressure accumulator 10. Fluid may in said case pass through the bore 54 into the bore 62, with the result that a pressure compensation occurs there.

If the pressure at the connection 48 continues to rise, at a so-called maximum pressure in the fluid chamber 22 the seal 72 of the piston 64 reaches the sealing surface 68 and effects sealing there. The piston 64 is situated almost in its end position and the valve arrangement 74 once more closes between the fluid chamber 22 and the feed line 24 and/or the admission chamber 76. The metal bellows 16 are therefore protected from being damaged by excess pressure since no fluid can pass from the admission chamber 76 into the fluid chamber 22.

At the sealing surfaces 66 and 68, the piston 64 may slide with the seal 72 along an axial stroke distance $X_1$ and $X_2$, respectively. The sealing is maintained during said stroke distances $X_1$ and $X_2$ while a slight pressure compensation between the fluid chamber 22 and the admission chamber 76 is possible. In said manner it is possible to compensate elasticity and thermal expansion as described above.

To prevent the piston 64 from moving the seal 72 beyond the sealing surface 66, i a phase 78 is formed in the—in FIG. 1—axially bottom, inner end of the piston 64 and on the closing portion 38 an end stop 80 is formed which lies opposite the piston 64 and against which the piston 64 may rest in a defined manner.

Furthermore, a seal 82 is inserted into the closing portion 38 in the region of said end stop 80 which seal 82, together with an opposing sealing seat 84 formed on the piston 64, forms a redundant seal of the piston 64 in the normal position. The seal 82 may alternatively be inserted in the piston 64.

Formed on the inside of the end wall 30 is an end stop 86 against which the disk 18 rests in the—in relation to FIG. 1—top end position of the piston 64.

FIG. 2 shows an embodiment of a gas pressure accumulator 10, which is of a construction similar to the one illustrated in FIG. 1. In said gas pressure accumulator 10, however, the disk 18 is integrally connected to the rod 60 and a hollow cylinder 44'. The rod 60 is guided in an axially displaceable manner in a bore 54' of the mandrel 46 and is penetrated by a bore 62', which connects the bore 50 to the admission chamber 76. A piston 64' is integrally formed with the mandrel 46 at the end directed towards the hollow cylinder 44'.

In said embodiment, the hollow cylinder 44' is moved during the stroke of the disk 18, while the piston 64' remains stationary. Otherwise, the function of the valve arrangement is identical to that described above for FIG. 1.

In contrast to the embodiment of FIG. 1, an end stop 80' is formed on the piston 64'. Furthermore, an axially directed seal 82' which with an opposing sealing seat 84' on the disk 18 forms a redundant seal of the piston 64' in the normal position is disposed on the piston 64'.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle brake system having a gas pressure accumulator, which comprises a housing, the interior of which is divided into a gas chamber and a fluid chamber by metal bellows and a disk fastened to the metal bellows in gas-tight manner, wherein via a feed line a fluid may be supplied under pressure to and removed from the fluid chamber, and provided between the fluid chamber and the feed line is a valve arrangement, which closes when the pressure in the feed line drops below a minimum value and opens when the pressure exceeds the minimum value, wherein the metal bellows during supply and removal of the fluid executes a stroke motion by means of which the valve arrangement is actuated, and wherein the disk is integrally connected to a rod, an axial bore being formed in one of the rod and a mandrel, and the other of the rod and the mandrel being slidingly disposed in the bore to axially guide the rod relative to the mandrel.

2. The vehicle brake system having a gas pressure accumulator according to claim 1, wherein the housing comprises a closing portion which at its side facing the interior of the housing is provided, coaxially, with a hollow cylinder and the mandrel.

3. The vehicle brake system having a gas pressure accumulator according to claim 2, wherein a piston is guided on the mandrel.

4. The vehicle brake system having a gas pressure accumulator according to claim 3, the piston as well as the hollow cylinder are disposed radially inside the metal bellows.

5. The vehicle brake system having a gas pressure accumulator according to claim 2, wherein a connection is formed on the outside of the closing position, said connection being connected with the interior of the housing through a bore.

6. The vehicle brake system having a gas pressure accumulator according to claim 5, wherein between the piston, the hollow cylinder and the closing portion an admission chamber is created which is in communication with the connection through the bore.

7. The vehicle brake system having a gas pressure accumulator according to claim 6, wherein the piston is integrally connected with the rod and the diameter of the piston is larger than the diameter of the rod.

8. The vehicle brake system according to claim 1, wherein the housing comprises a closing portion which at its side facing the interior of the housing is provided with the mandrel, the mandrel having a piston fixed thereto.

9. The vehicle brake system according to claim 8, wherein a hollow cylinder is fixed to the rod, the cylinder operatively engaging the piston fixed to the mandrel.

10. A vehicle brake system having a gas pressure accumulator, which comprises:

a housing, the interior of which is divided into a gas chamber and a fluid chamber by a metal bellows and a disk fastened to the metal bellows in gas-tight manner;

a feed line via which a fluid may be supplied under pressure to and removed from the fluid chamber;

a valve arrangement provided between the fluid chamber and the feed line, which valve arrangement closes when the pressure in the feed line drops below a minimum value and opens when the pressure exceeds the minimum value, wherein the metal bellows during supply and removal of the fluid executes a stroke motion by means of which the valve arrangement is actuated; and a rod integrally connected with the disks, an axial bore being formed in the rod, the bore receiving a mandrel therein, the rod being axially and slidingly guided on the mandrel.

11. A gas pressure accumulator which comprises a housing, the interior of which is divided into a gas chamber and a fluid chamber by metal bellows and a disk fastened to the metal bellows in gas-tight manner, wherein via a feed line a fluid may be supplied under pressure to and removed from the fluid chamber, and provided between the fluid chamber and the feed line is a valve arrangement, which closes when the pressure in the feed line drops below a minimum value and opens when the pressure exceeds the minimum value, wherein the metal bellows during supply and removal of the fluid executes a stroke motion by means of which the valve arrangement is actuated, and wherein the disk is integrally connected with a rod, which rod is axially and slidingly guided on a mandrel by means of one of a bore formed in the rod into which the mandrel extends and a bore in the mandrel into which the rod extends.

12. The gas pressure accumulator according to claim 11, wherein the housing comprises a closing portion having a side facing the interior of the housing, on which side the mandrel is provided, coaxially arranged with a hollow cylinder.

13. The gas pressure accumulator according to claim 12, wherein the mandrel is connected with the hollow cylinder on which a piston is guided.

14. The gas pressure accumulator according to claim 12, wherein the mandrel is connected with a piston on which the hollow cylinder is guided.

15. The gas pressure accumulator according to claim 13, wherein the piston as well as the hollow cylinder are disposed radially inside the metal bellows.

16. The gas pressure accumulator according to claim 12, wherein a connection is formed on the outside of the closing position, said connection being connected with the interior of the housing through a bore.

17. The gas pressure accumulator according to claim 16, wherein between the piston, the hollow cylinder, and the closing portion an admission chamber is created which is in communication with the connection through the bore.

18. The gas pressure accumulator according to claim 13 wherein the piston is integrally connected with the rod and the diameter of the piston is larger than the diameter of the rod.

19. A gas pressure accumulator for a vehicle brake system, which comprises a housing, the interior of which is divided into a gas chamber and a fluid chamber by metal bellows and a disk fastened to the metal bellows in gas-tight manner, wherein via a feed line a fluid may be supplied under pressure to and removed from the fluid chamber, and provided between the fluid chamber and the feed line is a valve arrangement, which closes when the pressure in the feed line drops below a minimum value and opens when the pressure exceeds the minimum value, wherein the metal bellows during supply and removal of the fluid executes a stroke motion by means of which the valve arrangement is actuated, and wherein the disk is integrally connected to a rod, an axial bore being formed in one of the rod and a mandrel, and the other of the rod and the mandrel being slidingly disposed in the bore to axially guide the rod relative to the mandrel.

20. A vehicle brake system having a gas pressure accumulator, which comprises:

a housing, the interior of which is divided into a gas chamber and a fluid chamber by a metal bellows and a disk fastened to the metal bellows in gas-tight manner;

a feed line via which a fluid may be supplied under pressure to and removed from the fluid chamber;

a valve arrangement provided between the fluid chamber and the feed line, which valve arrangement closes when the pressure in the feed line drops below a minimum value and opens when the pressure exceeds the minimum value, wherein the metal bellows during supply and removal of the fluid executes a stroke motion by means of which the valve arrangement is actuated; and a rod integrally connected with the disk, the rod being axially and slidingly guided in a bore in a mandrel.

* * * * *

UNITED STATES PATENT AND TRADEMARK OFFICE
CERTIFICATE OF CORRECTION

PATENT NO. : 6,666,529 B2
DATED : December 23, 2003
INVENTOR(S) : Kurt Mohr

It is certified that error appears in the above-identified patent and that said Letters Patent is hereby corrected as shown below:

Column 5,
Line 15, after "claim 3," insert -- wherein --.
Line 53, delete "disks" and insert -- disk --.

Signed and Sealed this

Twenty-fourth Day of February, 2004

JON W. DUDAS
*Acting Director of the United States Patent and Trademark Office*